Inventor
Charles Botel
By C. A. Snow & Co.
Attorneys.

April 4, 1933. C. BOTEL 1,903,333

PLUMBING AND LEVELING INSTRUMENT

Filed Jan. 24, 1931 2 Sheets-Sheet 2

Inventor
Charles Botel
By C A Snow & Co.
Attorneys.

Patented Apr. 4, 1933

1,903,333

UNITED STATES PATENT OFFICE

CHARLES BOTEL, OF NEW YORK, N. Y.

PLUMBING AND LEVELING INSTRUMENT

Application filed January 24, 1931. Serial No. 511,034.

This invention relates to an instrument designed for inspecting construction work for the purpose of determining whether portions of the structure have been properly erected along perpendicular or other lines. It is particularly adapted for use in connection with structures utilizing steel skeleton frames.

One of the objects of the invention is to provide an instrument which can be attached readily to steel columns or other portions of a steel structure and then adjusted to a position whereby, by sighting through the instrument, it can be determined whether or not the columns or masonry work built about the columns is along correct lines.

It has been the practice generally to use a plumb bob for making inspections such as herein referred to, but these have not been satisfactory where a cord of considerable length is used because it has not been able to hold the cord stationary in the wind.

Another object is to provide an instrument utilizing a telescope such as used, for example, as a part of surveying instruments, there being means whereby the telescope can be adjusted readily to any desired position prior to the sighting operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings the preferred form of the invention has been shown.

Figure 1:
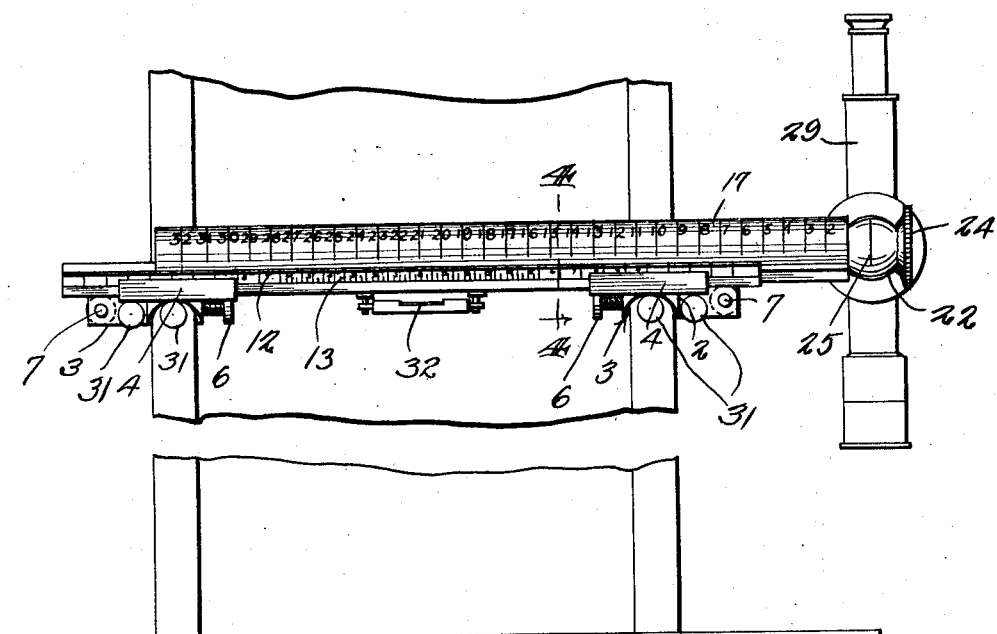
Figure 1 is an elevation of a portion of a structure showing a projecting column to which the instrument is attached for the purpose of sighting downwardly along the outer surface of an erected wall.
Figure 2:
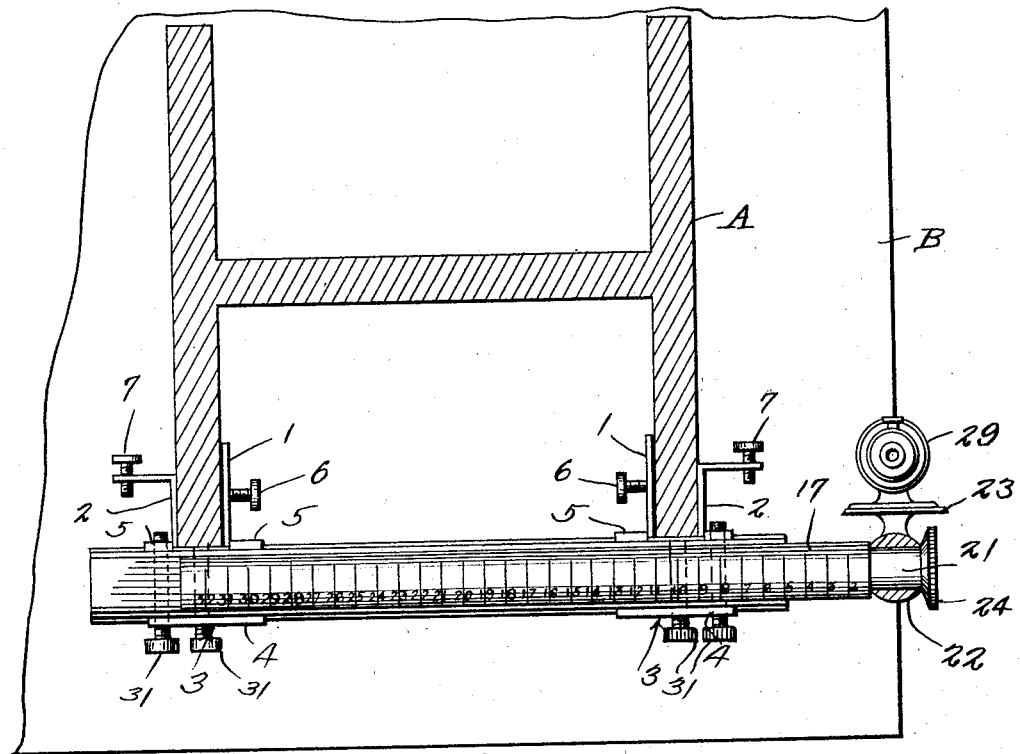
Figure 2 is a horizontal section showing the instrument in plan.
Figure 3:
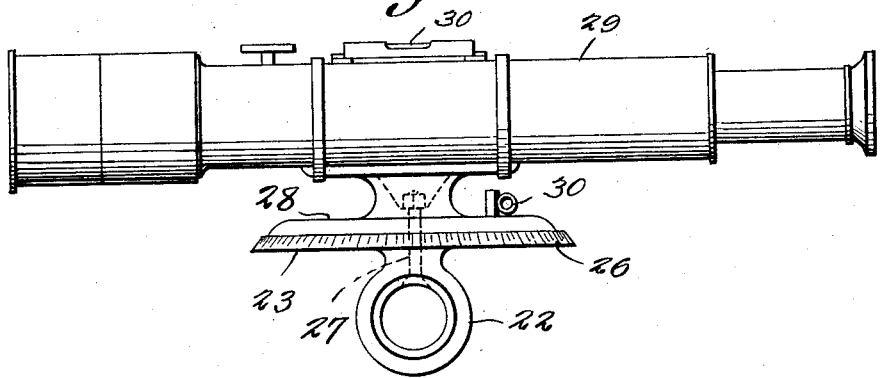
Figure 3 is a side elevation of the telescope and the base on which it is mounted.

Referring to the Figures by characters of reference, A designates a steel column which can be of the H type and, in the present instance, is shown projecting above a masonry wall B which has been erected about the lower portion of the column as illustrated in Figures 1 and 2. Two of the flanges of the column A are engaged by the instrument constituting the present invention. Each of these flanges is fitted between a straight arm 1 and an angular arm 2 which project from the back of a bracket 3. This bracket is extended at right angles to the arms 1 and 2 and is provided along opposed edges with opposed angular or channeled flanges 4 and 5. A set screw 6 is carried by arm 1 for tightly engaging the adjacent flange of column A. Another set screw 7 is carried by the angular arm 2 and is extended toward bracket 3. These set screws or clamping means are thus extended along intersecting lines.

Figures 4, 5:
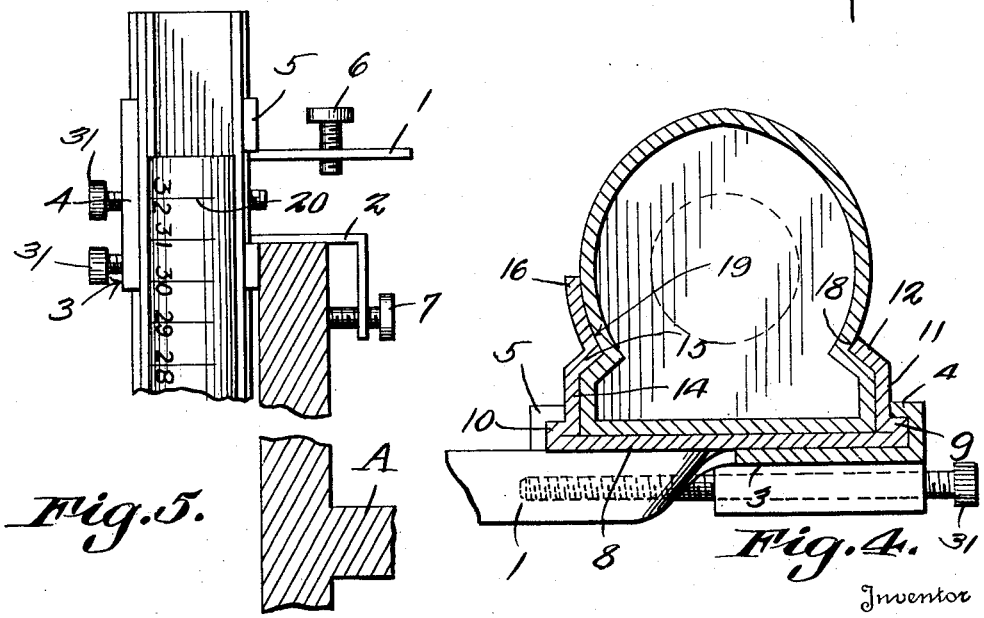
Figure 4 is an enlarged section through a portion of the instrument taken on line 4—4, Figure 1.
Figure 5 is a plan view of a portion of the instrument showing its attaching means rearranged for supporting the instrument along a flat face of a column.

As before explained two of the described attaching devices are used for holding the instrument to a column. If the instrument is to be held across one channeled face of the column the attaching devices are arranged as shown in Figures 1 and 2. However, if the instrument is to be supported along one flat side of the column the positions of the attaching devices are reversed and the longitudinal edges of the oppositely disposed flanges of the column A are extended between the set screws 7 and the brackets 3. One of the attaching devices arranged in this manner has been shown in Figure 5. Thus the brackets can be placed in different positions to meet conditions confronted by the user.

Supported by the brackets 3 is an elongated base strip 8 provided along its front and rear edges with longitudinal shoulders 9 and 10 adapted to slide within the angular or channeled flanges 4 and 5.

Extending upwardly from the shoulder 9 is a longitudinal flange 11 the upper edge portion of which is inclined upwardly and backwardly as shown at 12 and located on this upper portion is a scale consisting of a longitudinal series of graduations shown particularly at 13 in Figure 1. These graduations may indicate inches and fractions thereof. The middle graduation of the series is designated by "0" and the units of measure are designated from "1" upward both to the right and to the left of the "0" graduation.

Extending upwardly from the shoulder 10 is a longitudinal rear flange 14 the upper portion of which is inclined upwardly and forwardly as at 15 and merges into a longitudinally extending backing lip 16.

Slidably mounted between the flanges 11 and 14 is a bar 17 having longitudinal depressions 18 and 19 in the front and back portions thereof, into which extend the inclined portions 12 and 15 respectively. The backing lip 16 is extended back of and in contact with the bar. The bar is preferably rounded transversely upwardly from the depressions 18 and 19 and this rounded portion is provided with suitably designated graduations 20.

A stud 21 is extended from one end of bar 17 and projects through a collar 22 extending from the center of a circular base 23. A binding nut 24 engages the end of the stud 21 and after the collar 22 has been adjusted angularly about the stud, this nut can be tightened to hold the collar against further movement. A graduation is located at the center of the collar 22 as indicated at 25. This graduation is spaced from the end of bar 17 a distance equal to one unit of measure. The several units of measure indicated at 20 can designate inches and fractions thereof and can be designated in proper succession by numerals ranging from "2" upward.

The periphery of base 23 can be graduated to indicate the degrees of a circle, as shown at 26. A pivot bolt 27 extends outwardly from the center of this base and mounted for rotation thereon is a disc 28 on which is secured a telescope 29. The disc and the telescope are provided with spirit levels 30 and a spirit level 32 can also be connected to the bottom of the base 8.

Measurements made in connection with steel beams or columns are taken from the centers thereof. It is for this reason that the "0" graduation on the portion 12 is located at the center of the series of graduations.

When it is desired to ascertain whether a portion of a masonry wall erected about a column is plumb, the instrument is attached to either of the two outer sides of the upwardly projecting portion of the column A. The base strip 8 is adjusted to bring its "0" graduation to the center of the column. The base strip is leveled by means of the spirit level 32 and after it has been fastened securely the bar 17 is shifted longitudinally to bring graduation 25 a predetermined distance from the center or "0" graduation of scale 13. The telescope can be adjusted until the spirit levels indicate that it is in a vertical position. By then sighting downwardly through the telescope it can be determined whether or not the surface of the wall is plumb.

Obviously the instrument can be used for sighting in all directions, wherever it may be desired, on construction work and it will be found useful not only for inspecting masonry but also for inspecting the structural frame work as it is being erected.

As an added means for adjustment each of the brackets 3 can be provided with a pair of set screws 31 adapted to be forced against the column on which the instrument is mounted. All steel columns are put in place just the way they fit and in many instances the columns are out of square or not in line with the building. By adding these screws the instrument can be attached to the column and regulated square with the building line. This is not necessary for an engineer but it will be a great help to others.

What is claimed is:

1. An instrument of the class described including an elongated base having a scale thereon graduated from the center to the ends thereof, means for detachably and adjustably connecting said base to either of two angularly disposed faces of an angle column or the like, a graduated bar adjustably mounted on the base, a telescope mounted for angular adjustment on the bar, and level indicating devices carried by the telescope and the bar, respectively.

2. An instrument of the class described including a base having a longitudinal scale provided with an intermediate "0" graduation, means for adjustably and detachably connecting said base to any face of an angle column or the like, said means including brackets, arms extending from each bracket, one of said arms being angular, and clamping means carried by the respective arms and extended along intersecting lines, and a telescope adjustable relative to the base.

3. An instrument of the class described including a base, means for attaching the base to any face of an angle column or the like, a bar slidable on the base, a telescope mounted for angular adjustment about the bar and about an axis radiating from the bar, and level indicating devices carried by the base and telescope respectively.

4. An instrument of the class described including a base, means for adjustably attaching said base to a column, said base having a longitudinally graduated scale provided with an intermediate "0" graduation, a bar slidable on the base, a stud at one end of the bar, a collar rotatably mounted on the stud, there being a series of graduations on the bar and collar, the first one of the graduations of said series being disposed on the collar, and a telescope movable with the collar, said telescope being adjustable about an axis radiating from the collar and disposed in the same plane with said first graduation.

In testimony that I claim the foregoing as my own, I have hereto affixed my signature.

CHARLES BOTEL.